United States Patent
Hsieh

(10) Patent No.: US 9,561,583 B2
(45) Date of Patent: Feb. 7, 2017

(54) TORQUE WRENCH CAPABLE OF CORRECTING TORQUE AND TORQUE CORRECTION METHOD THEREOF

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

(*) Notice: Subject to any disclaimer, the term of this patent is extended or adjusted under 35 U.S.C. 154(b) by 266 days.

(21) Appl. No.: 14/280,073

(22) Filed: May 16, 2014

(65) Prior Publication Data
US 2014/0338419 A1    Nov. 20, 2014

(30) Foreign Application Priority Data
May 20, 2013 (TW) .............................. 102117804 A

(51) Int. Cl.
    *B25B 23/143*      (2006.01)
    *B25B 23/142*      (2006.01)
    *G01L 25/00*      (2006.01)
    *B25B 13/00*      (2006.01)

(52) U.S. Cl.
CPC ....... *B25B 23/1427* (2013.01); *B25B 23/1422* (2013.01); *G01L 25/003* (2013.01); *B25B 13/00* (2013.01)

(58) Field of Classification Search
CPC .............. B25B 23/142; B25B 23/1422; B25B 23/1425; G01L 5/0042; G01L 25/003; Y10T 29/49766
See application file for complete search history.

(56) References Cited

U.S. PATENT DOCUMENTS

| | | | | |
|---|---|---|---|---|
| 3,355,970 A | * | 12/1967 | Knudsen | B25B 23/1427 81/478 |
| 7,942,085 B2 | * | 5/2011 | Hsieh | B25B 13/463 81/477 |
| 8,485,075 B1 | * | 7/2013 | Gauthier | B25B 23/1425 81/177.5 |
| 2005/0155469 A1 | * | 7/2005 | Li | B25B 23/1427 81/479 |
| 2007/0039432 A1 | * | 2/2007 | Cutler | B25B 23/1427 81/478 |
| 2010/0147118 A1 | * | 6/2010 | Hsieh | B25B 13/463 81/477 |
| 2012/0132042 A1 | * | 5/2012 | Bruce | B25B 23/1425 81/479 |

* cited by examiner

*Primary Examiner* — Peter Macchiarolo
*Assistant Examiner* — Nathaniel Kolb
(74) *Attorney, Agent, or Firm* — Guice Patents PLLC

(57) ABSTRACT

A torque wrench includes a mechanical structure and an electronic structure. The mechanical structure includes a tubular body, a flexible rod, an abutment member, an elastic member, a trip mechanism, an adjustment mechanism and a mechanical scale indication mounted in the tubular body for indicating the set torque of the wrench. The electronic structure includes at least one torque sensor and a display unit. When correcting the torque value of the mechanical structure, a force is applied to the wrench and the torque sensor detects the trip torque value of the wrench. The torque value of the mechanical structure is adjusted to match the torque value detected by the torque sensor so as to eliminate the error of the torque value of the mechanical structure.

13 Claims, 11 Drawing Sheets

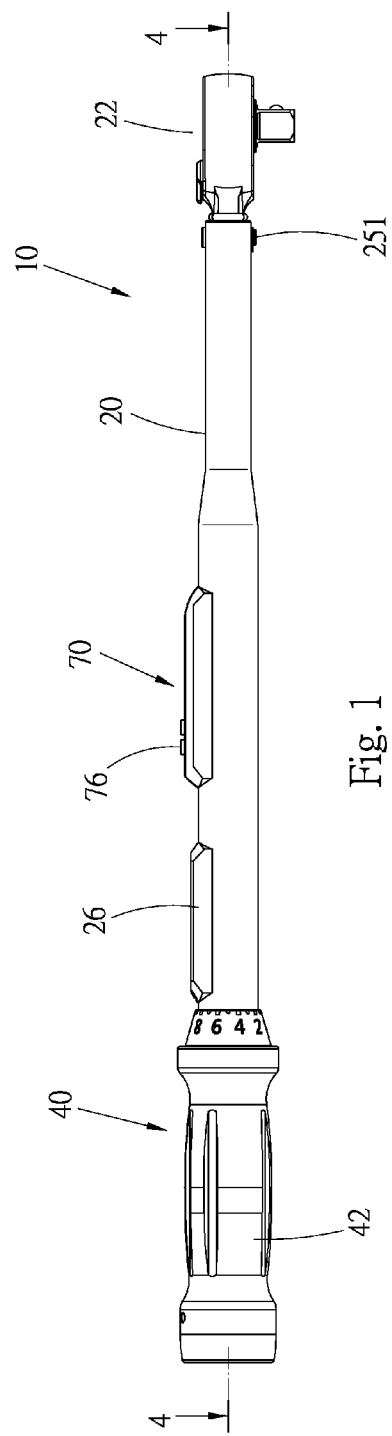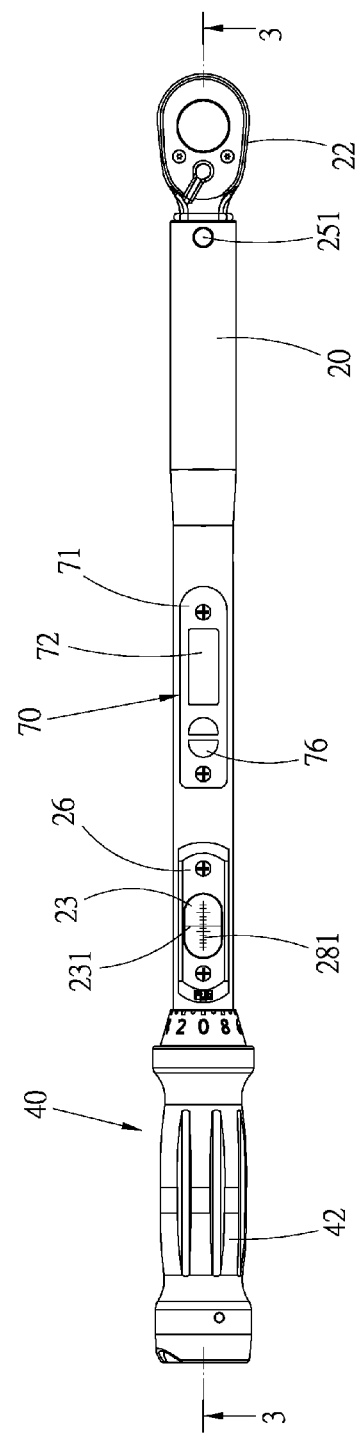

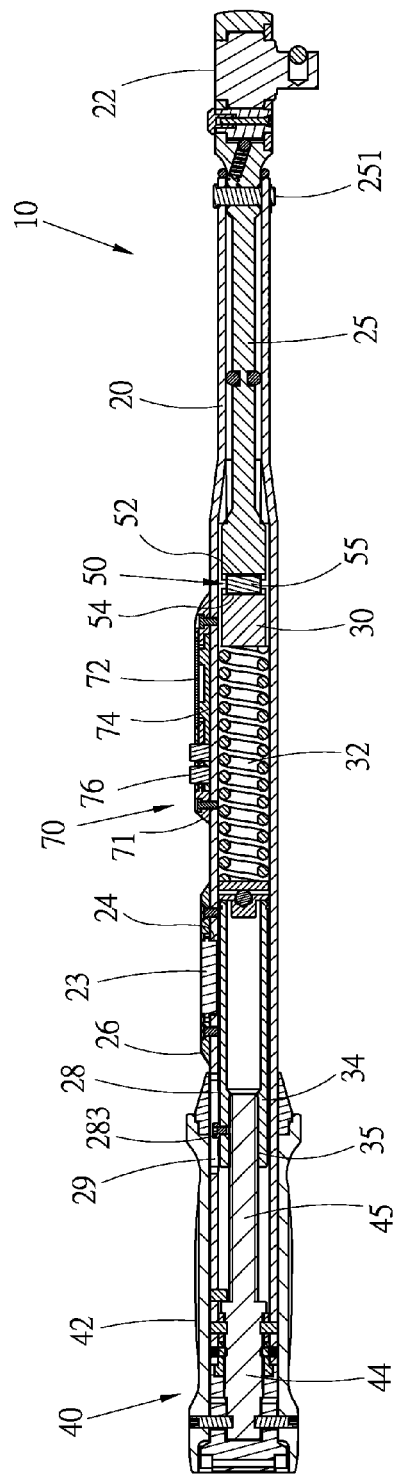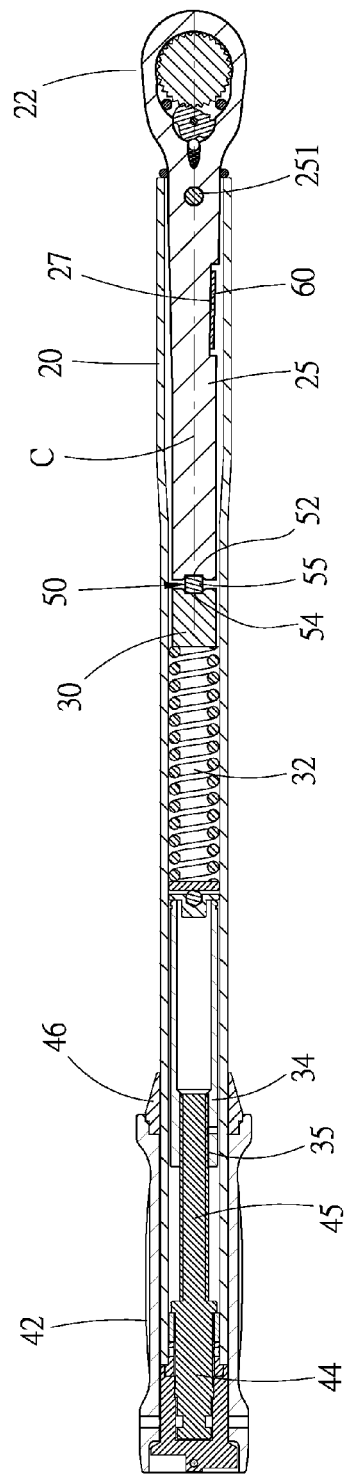
Fig. 3
Fig. 4

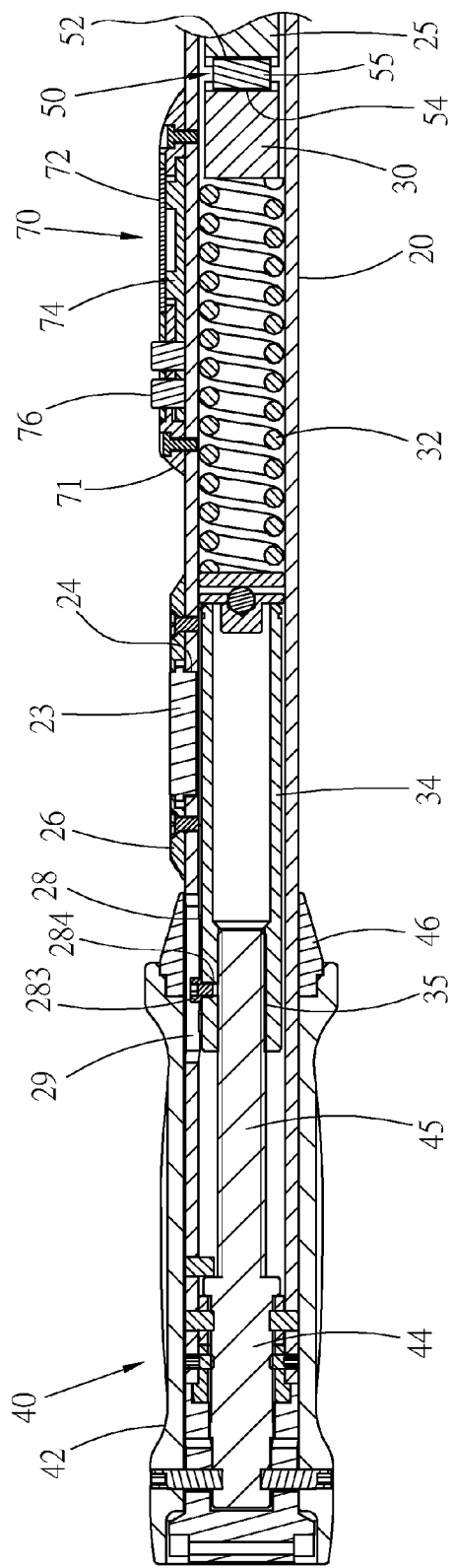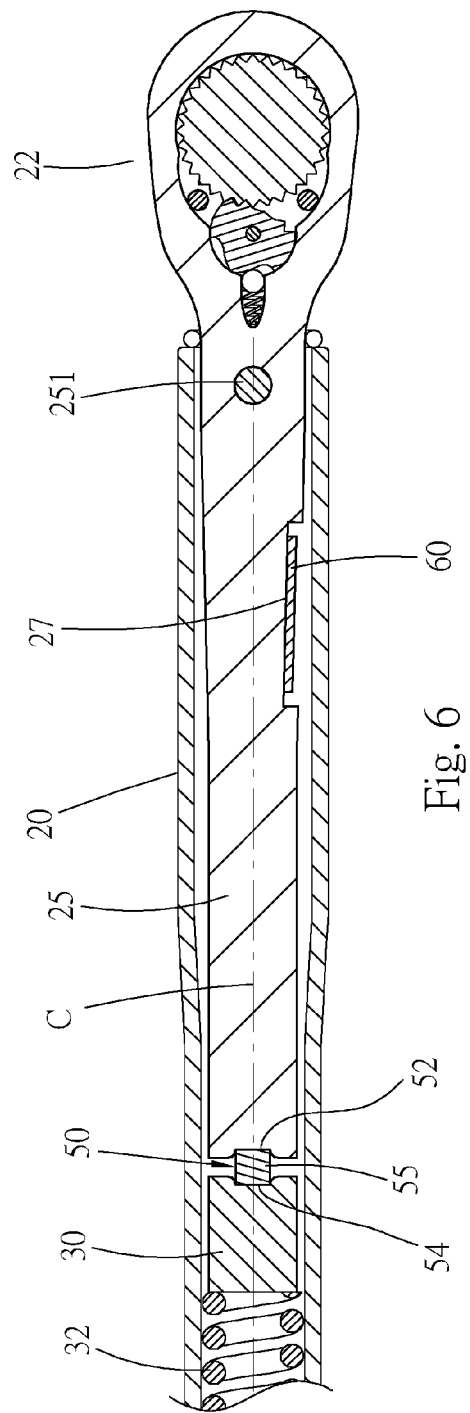

TORQUE WRENCH CAPABLE OF CORRECTING TORQUE AND TORQUE CORRECTION METHOD THEREOF

BACKGROUND OF THE INVENTION

1. Field of the Invention

The present invention relates generally to a torque wrench, and more particularly to a torque wrench capable of correcting torque and a torque correction method of the torque wrench.

2. Description of the Related Art

A conventional torque wrench is settable in torque value. When the application force of the wrench reaches a set torque value, an alert effect is provided. The mechanical torque wrench has a trip mechanism. An elastic member abuts against the trip mechanism. The wrench further has an adjustment mechanism for changing the elastic force applied by the elastic member to the trip mechanism. The handle of the wrench is formed with a window with scales for indicating the set torque value of the wrench. In use, the wrench is forced to a bolt or a nut. When the application force of the wrench exceeds the set torque value, the trip mechanism trips to shock the wrench and emit a sound to immediately alert a user that the application force of the wrench has reached the set value.

After a long period of use, the trip mechanism of the wrench will be apparently worn. In this case, the set torque value of the wrench is not the true trip torque value of the wrench. That is, there is an error between the set torque value and the true trip torque value. For example, the set torque value of the wrench is 2 N·m, while the true trip torque value of the wrench is only 1.6 N·m. In this case, actually, the bolt or the nut is not tightened by a necessary torque. This will threaten the security of mechanical equipment or a building.

In case of error of the torque value of the mechanical torque wrench, it is necessary for a user to send the wrench back to the manufacturer or the retailer to replace the parts or correct the torque value. The user himself/herself cannot correct the torque value.

SUMMARY OF THE INVENTION

It is therefore a primary object of the present invention to provide a mechanical torque wrench designed with a torque correction structure for a user himself/herself to correct the torque value of the wrench.

It is a further object of the present invention to provide a mechanical torque wrench capable of correcting torque and a torque correction method of the torque wrench. The torque wrench includes a mechanical torque trip mechanism and a mechanical torque adjustment mechanism and further includes at least one electronic torque sensor for detecting the true torque value of the wrench. The error of the torque value of the mechanical structure is correctable by the electronic component of the wrench.

A torque wrench capable of correcting torque of the invention, comprises:
a tubular body;
a head section positioned at a front end of the tubular body; a flexible rod pivotally disposed at the front end of the tubular body, a rear end of the flexible rod being positioned in the tubular body, a front end of the flexible rod being fixedly connected with the head section;
an abutment member and an elastic member disposed in the tubular body, the abutment member being positioned behind the flexible rod; a front end of the elastic member elastically abutting against the abutment member;
a trip mechanism disposed between the rear end of the flexible rod and the front end of the abutment member, the flexible rod and the abutment member being in contact with each other via the trip mechanism;
an adjustment mechanism disposed at the rear end of the tubular body in contact with the elastic member for adjusting the elastic force applied by the elastic member to the abutment member;
a mechanical scale indication positioned on the tubular body for reading the set torque value of the wrench;
at least one torque sensor disposed on one side of the flexible rod for detecting the strain of the flexible rod; and
at least one display unit disposed on the tubular body for displaying the torque value detected by the torque sensor.

Accordingly, the wrench has a mechanical structure and electronic components, the error of the torque value of the mechanical structure can be corrected by the electronic components.

A torque correction method of the above mentioned torque wrench comprises steps of:
(1) starting up: the wrench being powered on;
(2) setting/adjusting the torque value of the mechanical structure of the wrench for tightening a threaded member: the adjustment mechanism being used to set/adjust the torque of the mechanical structure of the wrench to a necessary value, the torque value of the mechanical structure being a torque value applied to the wrench when the trip mechanism trips;
(3) the torque sensor detecting the trip torque value of the trip mechanism: the wrench being forced to wrench the threaded member until the trip mechanism trips, when the trip mechanism trips, the torque sensor detecting the torque value applied to the flexible rod;
(4) the display unit displaying the torque value when the trip mechanism trips: when the trip mechanism trips, the torque value applied to the flexible rod that is detected by the torque sensor being displayed on the display unit;
(5) comparing the set/adjusted torque value of the mechanical structure of the wrench with the torque value detected by the torque sensor to find whether the torque value detected by the torque sensor matches the set/adjusted torque value of the mechanical structure, if not, the procedure going back to step 2 to correct the torque value again; and
(6) completing the correction and turning off: through step 5, if the torque value detected by the torque sensor matches the set/adjusted torque value of the mechanical structure, the wrench being powered off to end the correction process.

Accordingly, when the torque value of the mechanical structure is error, by performing the correction process, the electronic torque sensor precisely detect the true trip torque value of the wrench to correct the torque value of the mechanical structure of the torque wrench. A user can perform the torque correction process.

The present invention can be best understood through the following description and accompanying drawings, wherein:

BRIEF DESCRIPTION OF THE DRAWINGS

FIG. 1 is a top view of a first embodiment of the torque wrench of the present invention;

FIG. 2 is a side view of the first embodiment of the torque wrench of the present invention;

FIG. 3 is a sectional view taken along line 3-3 of FIG. 2;

FIG. 4 is a sectional view taken along line 4-4 of FIG. 1;

FIG. 5 is an enlarged view of a part of FIG. 3;

FIG. 6 is an enlarged view of a part of FIG. 4;

DETAILED DESCRIPTION OF THE PREFERRED EMBODIMENTS

Figure 7:
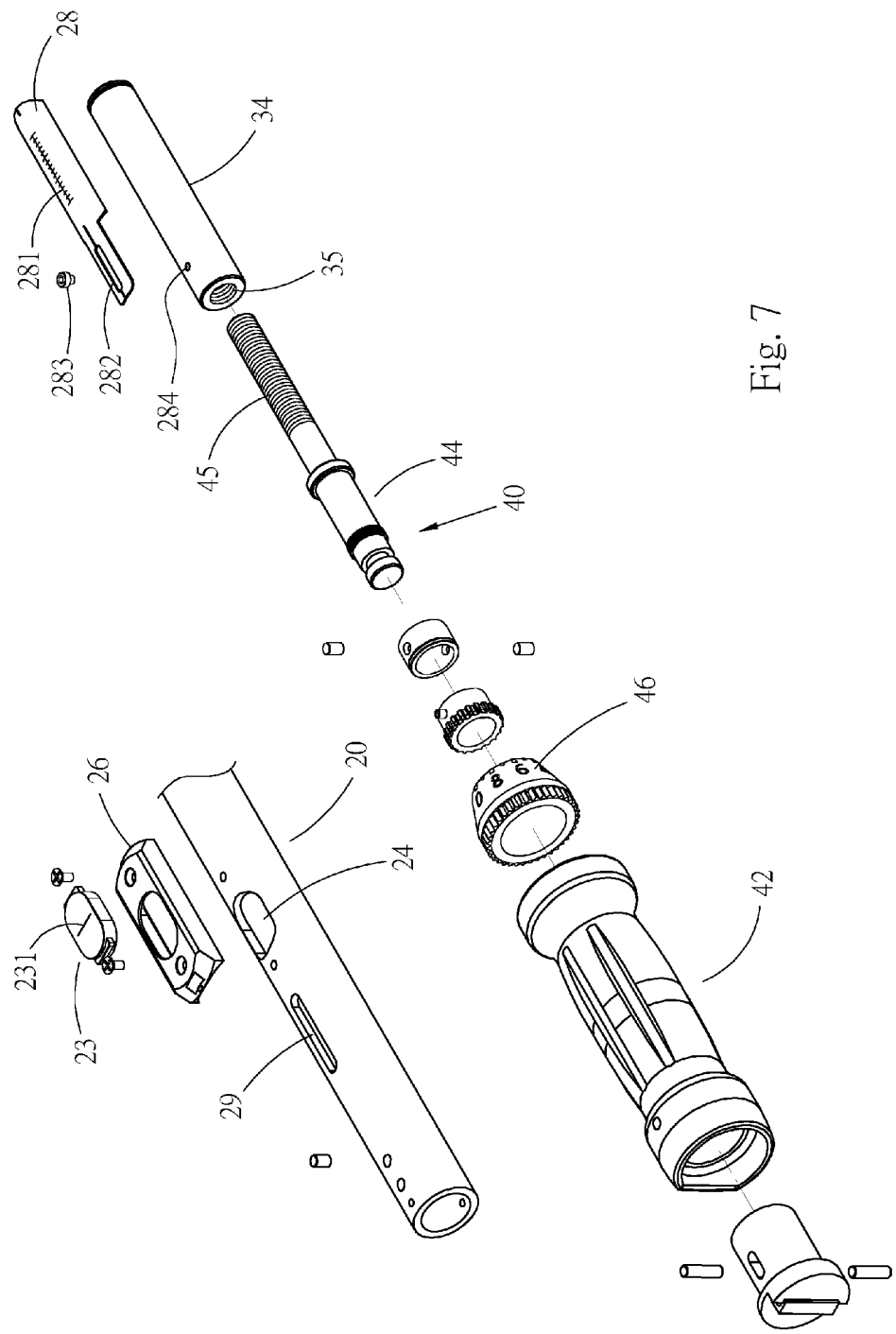
FIG. 7 is a perspective partially exploded view of the first embodiment of the torque wrench of the present invention.

Please refer to FIGS. 1 to 4. According to a first embodiment, the torque wrench 10 of the present invention is a mechanical torque wrench having a mechanical trip mechanism. The torque wrench 10 also includes electronic components including a torque sensor and an electronic screen. The present invention is such designed that its own electronic components serve to correct the torque of the mechanical structure.

The structure of the wrench is described hereinafter. Please refer to FIGS. 3 to 5. The wrench 10 has a tubular body 20 and a head section 22 positioned at a front end of the tubular body 20. The head section 22 can have the form of an open wrench or a ratchet wrench and is not limited to the structure of this embodiment. The head section 22 of the wrench 10 is used to wrench a threaded member (such as a bolt or a nut) or a socket. A flexible rod 25, which is a left and right symmetrical rod body, is pivotally disposed at the front end of the tubular body 20 via a pivot pin 251. The flexible rod 25 is swingable around the pivot pin 251. A rear end of the flexible rod 25 is positioned in the tubular body 20. A front end of the flexible rod 25 is fixedly connected with the head section 22.

An abutment member 30, an elastic member 32 (compression spring) and a slide member 34 are rearward sequentially arranged in the tubular body 20. The abutment member 30 is positioned behind the flexible rod 25 and slidable within the tubular body 20. The slide member 34 is slidable within the tubular body 20 without possibility of rotation. The slide member is formed with an internal threaded hole 35. The elastic member 32 is positioned between the abutment member 30 and the slide member 34. A front end and a rear end of the elastic member 32 respectively elastically abut against the abutment member 30 and the slide member 34.

An adjustment mechanism 40 includes the slide member 34, a handle 42 fitted around the rear end of the tubular body 20 and an adjustment member 44 disposed in the tubular body 20. The adjustment member 44 is rotatable within the tubular body 20 without possibility of displacement. A rear end of the adjustment member 44 is directly connected with the handle 42 or indirectly connected with the handle 42 via another component. A front end of the adjustment member 44 is a threaded rod section 45 screwed in the threaded hole 35 of the slide member 34. When rotating the handle 42, the adjustment member 44 is rotated along with the handle 42, whereby the threaded rod section 45 drives the slide member 34 to back and forth slide along the tubular body 20 so as to adjust the slide member 34 to different positions. Accordingly, the elastic force applied by the elastic member 32 to the abutment member 30 is adjustable. The handle 42 can be taken off from the rear end of the tubular body 20 and disconnected from the adjustment member 44. An end collar 46 is detachably fitted with the front end of the handle 42. A circumference of the end collar 46 is marked with scales.

Please now refer to FIG. 6. A trip mechanism 50 is disposed between the rear end of the flexible rod 25 and the abutment member 30. When the application force of the wrench exceeds a set torque, the trip mechanism provides a trip effect. The trip mechanism 50 can have different forms. In this embodiment, the trip mechanism 50 includes a first recess 52 formed at the rear end of the flexible rod 25, a second recess 54 formed at the front end of the abutment member 30 and an abutment block 55 in the form of a rectangular solid or a cuboid. The abutment block 55 is in contact with the two recesses 52, 54. The width of the two recesses 52, 54 is equal to or slightly larger than the width of the abutment block 55. The elastic member 32 applies an elastic force to the abutment member 30, whereby the abutment block 55 is elastically held by the abutment member 30 and the flexible rod 25.

In normal state, the two recesses 52, 54 of the trip mechanism 50 are right aligned with each other and the front and rear end faces of the abutment block 55 respectively contact the two recesses.

Please refer to FIGS. 5 and 7. In this embodiment, the wrench has a mechanical scale indication. To speak more specifically, a window 24 is formed on a top face of the tubular body 20. A transparent piece 23 is mounted in the window 24. A mark 231 is disposed on the surface of the transparent piece 23. A cover body 26 is fixed on the outer circumference of the tubular body 20 to secure the transparent piece 23. Scales 281 are printed on the surface of a scale plate 28. The scale plate 28 is formed with a longitudinal slot 282. A connection member 283, which is a small screw, is passed through the slot 282 and screwed with a screw hole 284 on the slide member 34 to detachably fix the scale plate 28 on the circumference of the slide member 34, whereby the scale plate 28 is positioned below the window 24 and movable along with the slide member 34. Please refer to FIG. 2. A user can see the scales 281 of the scale plate through the transparent piece 23 so as to know the value of the set torque of the wrench. The tubular body 20 has a hollow section. The small screw 283 corresponds to the hollow section. In this embodiment, the hollow section is a longitudinal slot 29 formed on the tubular body 20, the small screw 283 is received in the longitudinal slot 29. By means of the small screw 283 being restrained/received in the longitudinal slot 29, the slide member 34 can only slide within the tubular body 20 without possibility of rotation.

In addition to the above mentioned mechanical structure, the wrench of the present invention further has the following electronic structure for correcting the torque of the wrench. Please refer to FIG. 6. At least one side of the flexible rod 25 is formed with a recess 27. At least one torque sensor 60 such as a tension gauge or a strain gauge is disposed in the recess 27 of the flexible rod 25 for detecting the strain of the flexible rod.

Please refer to FIG. 2. A display unit such as an electronic display panel 72 of a liquid crystal screen is disposed on the circumference of the tubular body 20. The display unit is electrically connected to the torque sensor 60. The torque value detected by the torque sensor can be displayed on the display panel 72. To speak more specifically, as shown in FIG. 5, an electronic device 70 is mounted on the tubular body 20, including a housing 71, the electronic display panel 72, a circuit unit (such as a circuit board 74 with printed circuits) and at least one pushbutton 76. In this embodiment, there are two pushbuttons. The housing 71 is fixedly disposed on the tubular body 20. The electronic display panel 72, the circuit board 74 and the two pushbuttons 76 are disposed in the housing 71. The display panel 72 and the two pushbuttons 76 are electrically connected to the circuit board 74. The torque sensor 60 is also electrically connected to the circuit board 74. By means of the operation of the circuit unit, the torque value detected by the sensor 60 can be displayed on the display panel 72. The two pushbuttons 76 can execute several use functions such as, but not limited to, powering on/off, numeral input, selection, setting and storage.

Figure 8:
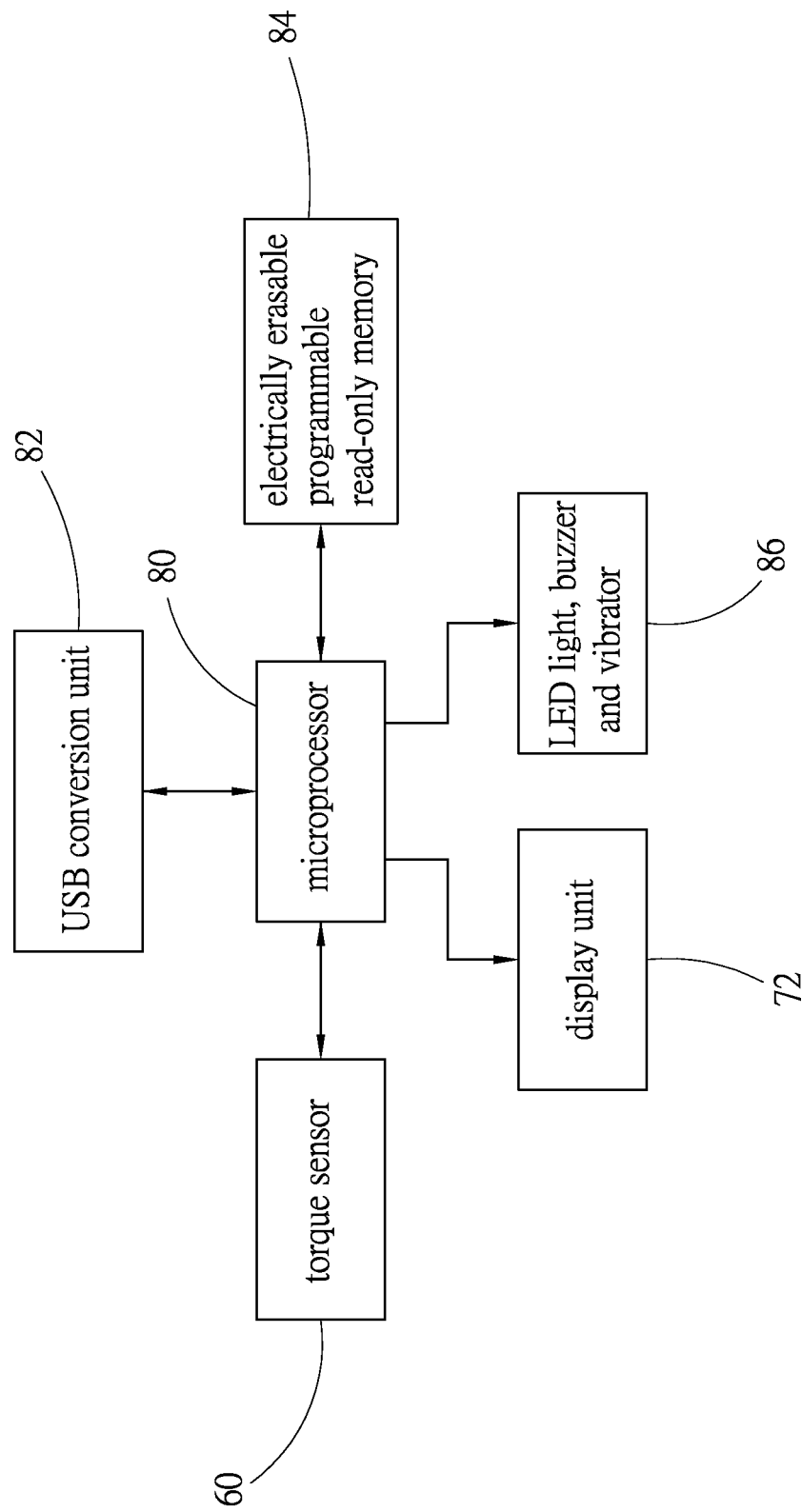
FIG. 8 is a circuit diagram of the first embodiment of the torque wrench of the present invention.

Please refer to FIG. 8. The circuit structure of the electronic device 70 includes a microprocessor 80, a USB conversion unit 82 electrically connected to the microprocessor 80, an electrically erasable programmable read-only memory (EEPROM) 84 and the torque sensor 60 and the display unit 72. At least one LED light, a buzzer and a vibrator 86 can be further disposed. In addition, a power supply is disposed on the wrench in a proper position for electronic device 70.

In use of the wrench 10 of the present invention, the mechanical structure of the wrench is a mainly used part for judging whether the torque has reached the set torque value. As aforesaid, when a user desires to set the torque of the wrench, by means of the adjustment mechanism 40, the slide member 34 is driven to slide so as to change the elastic energy of the elastic member 32. When the elastic member 32 abuts against the abutment member 30 by a greater elastic force, the wrench is set with a higher torque. In this case, it is necessary to apply a greater action force to the trip mechanism 50 to trip the trip mechanism 50. Reversely, when the elastic member 32 abuts against the abutment member 30 by a smaller elastic force, the wrench is set with a lower torque. The user can know the set torque value from the scale 281 of the scale plate 28.

Figure 9:
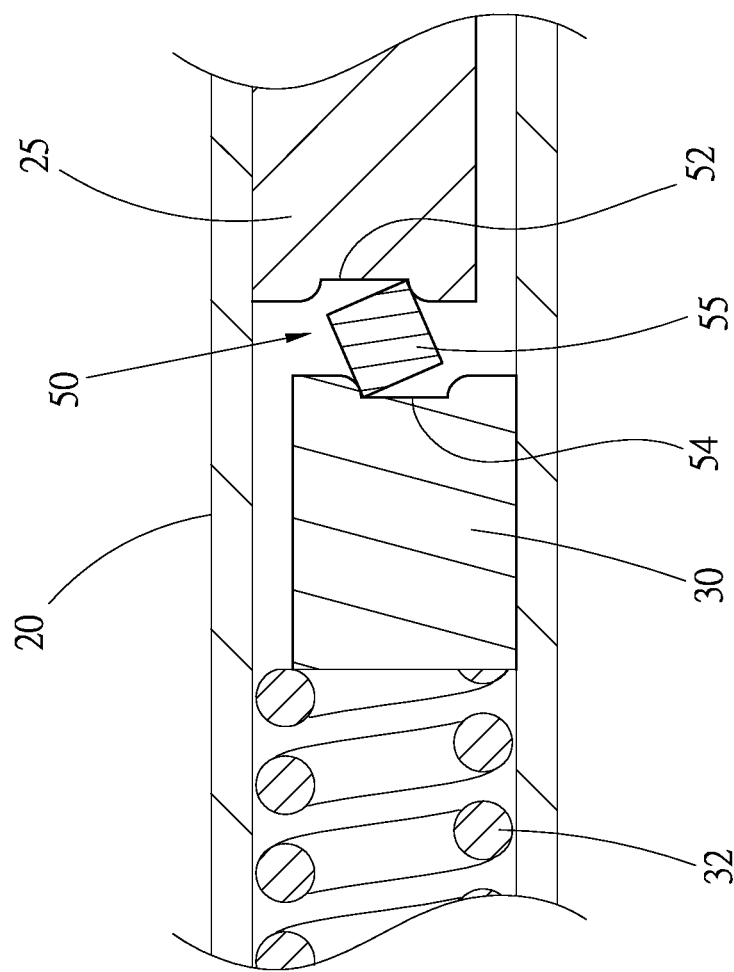
FIG. 9 is a partially sectional view of the first embodiment of the torque wrench of the present invention.

When the force applied by the wrench 10 to a threaded member or a socket for wrenching the same reaches the set torque, the trip mechanism 50 will slip/trip as shown in FIG. 9. At this time, the rear end of the flexible rod 25 and the abutment member 30 are respectively deflected to two sides and the two recesses 52, 54 are misaligned from each other. The abutment block 55 is rotated to contact the two recesses at two corners respectively. When the trip mechanism 50 trips, the wrench will be shocked and a sound is emitted. Through the shock and the sound, the user can easily and quickly judge that the application force of the wrench has reached the set torque. In usual use of the wrench 10, it is unnecessary to power on the electronic structure of the wrench. That is, the sensor 60 is not used to detect whether the torque of the wrench has reached the set value.

After a period of use of the wrench, the trip mechanism 50 will be worn. Under such circumstance, the elastic force applied by the elastic member 32 to the slide member 34 is lowered. This will cause error of the wrench. For example, the scale plate 28 indicates that the set torque of the wrench 10 is 2N, but the true torque is only 1.6N. Under such circumstance, a user can utilize the electronic components of the wrench to correct the error of the mechanical structure.

Figure 10:
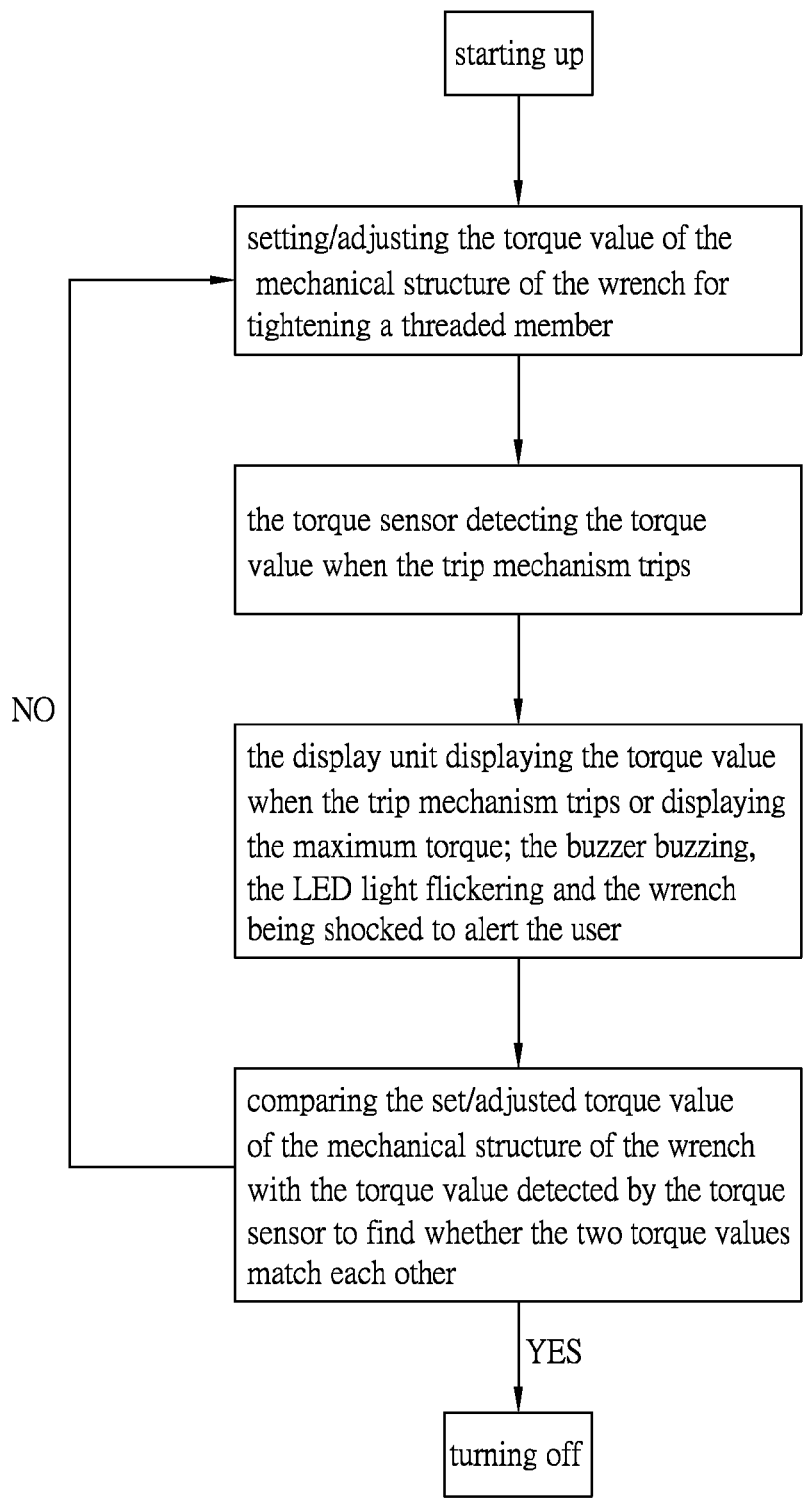
FIG. 10 is a flow chart of the torque correction method of the present invention.

FIG. 10 is a flow chart of the torque correction method of the wrench 10. The mechanical structure of the wrench is composed of the flexible rod, the abutment member, the elastic member, the slide member, the trip mechanism and the adjustment mechanism. The electronic structure of the wrench is composed of the torque sensor and the electronic device. The torque correction method of the wrench of the present invention includes steps of:

1. starting up:
    a pushbutton 76 being pressed to power on the electronic device 70 for operating the electronic device;
2. setting/adjusting the torque value of the mechanical structure of the wrench for tightening a threaded member:
    the adjustment mechanism 40 being used to set/adjust the torque value of the mechanical structure of the wrench to a necessary value, the torque value of the mechanical structure to be set/adjusted being a torque value applied to the wrench when the trip mechanism 50 trips, such as 3N (indicated by the scale plate);
3. the torque sensor detecting the torque value of the wrench when the trip mechanism trips:
    the wrench 10 being forced to wrench the threaded member, in the wrenching process, the flexible rod 25 being flexed and the torque sensor 60 detecting the strain of the flexible rod 25 to real-time detect the torque of the wrench, the wrench being continuously forced until the trip mechanism 50 trips, whereby the sensor 60 can detect the torque value applied to the flexible rod 25 when the trip mechanism 50 trips, which is the true torque value of the wrench, the electronic torque sensor 60 being able to precisely detect the torque value so that the true torque value of the wrench can be detected;
4. the display unit displaying the torque value when the trip mechanism trips or displaying the maximum torque; the buzzer buzzing, the LED light flickering and the wrench being shocked to alert the user:
    when tripping, the torque value corresponding to the strain of the flexible rod 25 detected by the torque sensor 60 being displayed on the display panel 72, the circuit of the electronic device 70 being such designed that the torque applied to the wrench when the trip mechanism 50 trips being displayed on the display panel 72 or the maximum torque applied to the wrench prior to the trip being displayed on the display panel, that is, the torque value displayed on the display panel 72 being the maximum torque value of the wrench during the correction process, the present invention recording the peak value of the torque, the recorded value or the value displayed on the display panel being the maximum torque value of the trip mechanism 50 during the correction process, the electronic device 70 further including an LED light, a buzzer and a shocking unit, whereby when the trip mechanism trips, the LED light flickers, the buzzer buzzes and the shocking unit shocks the wrench to alert the user of the trip;
5. comparing the set/adjusted torque value of the mechanical structure of the wrench with the torque value detected by the torque sensor to find whether the two torque values match each other:
    the torque value detected by the torque sensor 60 (hereinafter referred to as electronic detected torque value)

being displayed on the display panel 72, the set torque value of the mechanical structure of the wrench (the torque value indicated by the scale plate, hereinafter referred to as mechanical torque value) being compared with the electronic detected torque value, in case the mechanical torque value is different from the electronic detected torque value, for example, the electronic detected torque value is 2.7N, while the set torque value of the mechanical structure is 3N, then the procedure going back to step 2 to correct the torque value again, that is, the torque of the mechanical structure of the wrench being further adjusted according to the difference (0.3N) between the electronic detected torque value and the mechanical torque value; and 6. completing the correction and turning off:
    after correction steps 2 to 5, the mechanical torque value matching the electronic detected torque value and the torque correction process being completed, whereby the true torque value of the mechanical structure of the wrench is recovered, the electronic device 70 being powered off to end the correction process.

After adjusted, the mechanical torque value ranges from 0.96 time the electronic detected torque value to 1.04 times the electronic detected torque value in accordance with the required precision. Preferably, after adjusted, the mechanical torque value is 1.04 times the electronic detected torque value.

In the present invention, the electronic structure of the wrench serves to correct the torque value of the mechanical structure. The key point of the structural design of the present invention is that the trip mechanism 50 is positioned in the central line C of the flexible rod 25. That is, the two recesses 52, 54 and the abutment block 55 are all positioned in the central line C in alignment with each other. It is found through researches that only with the trip mechanism 50 positioned in the central line C of the flexible rod 25, the torque value detected by the sensor 60 is the true trip torque value of the wrench. In the case that the trip mechanism 50 is misaligned from the central line C of the flexible rod, then the torque value detected by the sensor 60 is not the true trip torque value of the wrench. In this case, the maximum error may even be a dozen percent.

Figure 11:
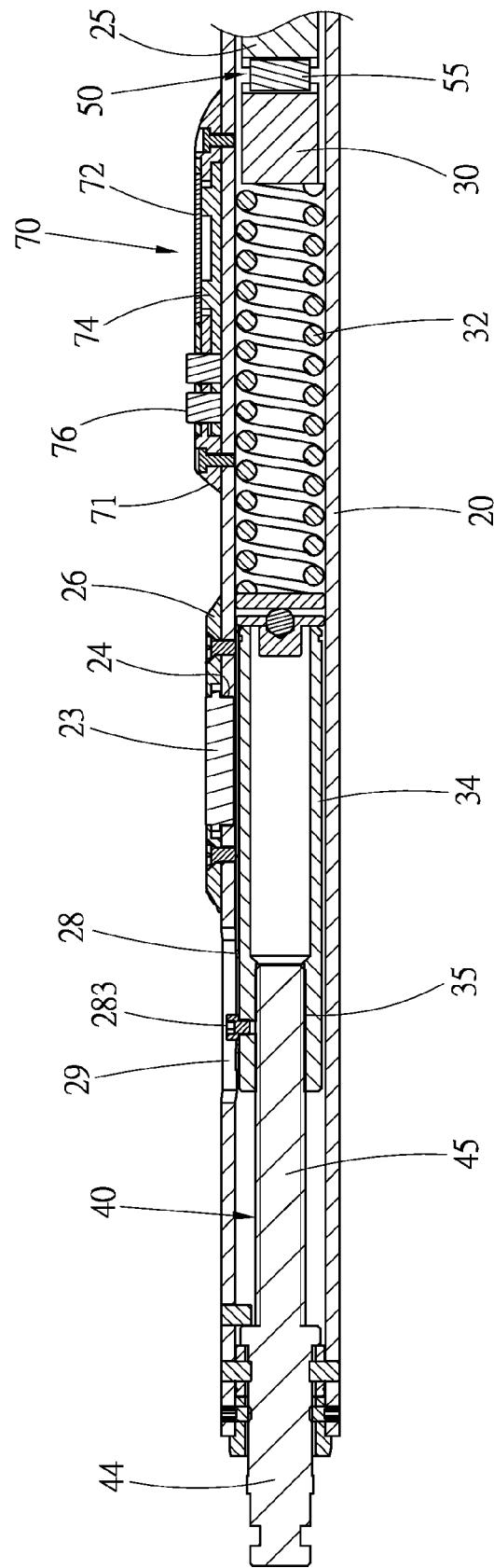
FIG. 11 is a sectional view of the first embodiment of the torque wrench of the present invention, showing that the torque value is corrected.

FIG. 11 shows the way to adjust the torque value of the mechanical structure of the wrench 10. The wear of the trip mechanism 50 will lead to weakening of the elastic energy of the elastic member 32. As a result, the torque value of the mechanical structure of the wrench is untrue. During the correction process, the true elastic energy of the elastic member 32 is recovered. A user moves the slide member 34 to get closer to the trip mechanism 50 so as to increase the elastic energy of the elastic member for compensating the error caused by decrease of the elastic energy resulting from the wear of the trip mechanism. In case of error, the indicated scale of the scale plate 28 is incorrect. Therefore, it is necessary to adjust the position of the scale plate 28 on the slide member 34. Accordingly, in step 2, when it is desired to adjust the torque value, the handle 42 of the adjustment mechanism 40 is detached as shown in FIG. 11. At this time, a corrector can unscrew the small screw 283 to release the scale plate 28. Then, according to the electronic detected torque value, the scale plate 28 is moved rearward to a true position and tightened, whereby the scale plate 28 is positioned in a position where the true torque value is indicated. After the correction is completed, the torque value indicated by the scale plate matches the torque value detected by the torque sensor 60.

Figure 12:
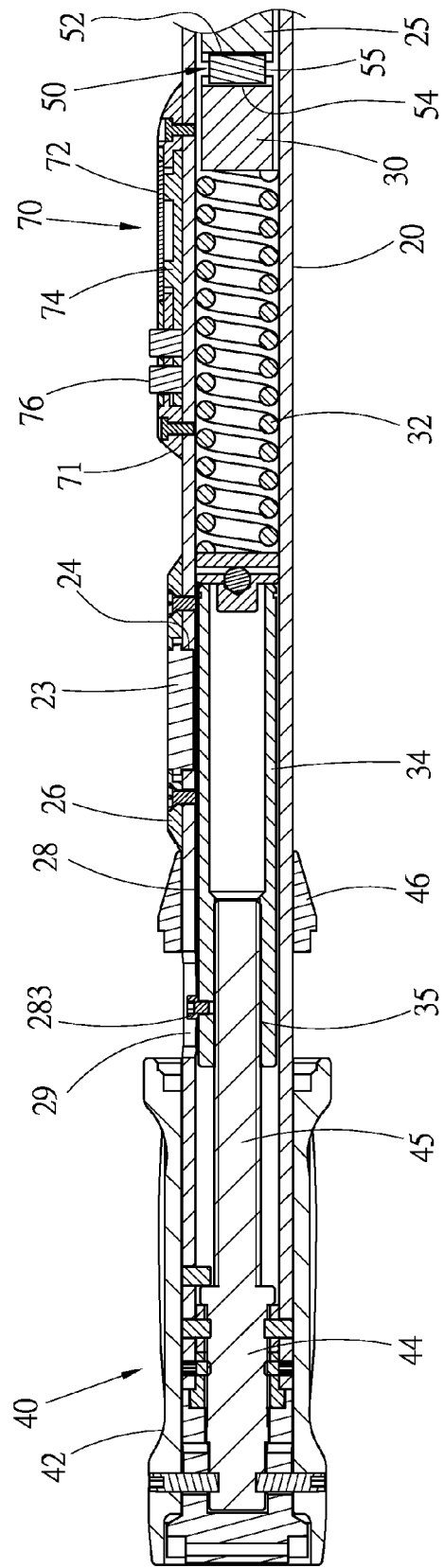
FIG. 12 is a sectional view of a part of a second embodiment of the wrench of the present invention.

FIG. 12 shows a second embodiment of the wrench 10 of the present invention, in which the same components are denoted with the same reference numerals of the first embodiment. In this embodiment, when performing step 2, the end collar 46 is separated from the handle 42 to expose the slot 29 and the small screw 283 to outer side for adjusting the position of the scale plate 28. After the scale plate 28 is adjusted to a true position, the end collar 46 is refitted with the front end of the handle 42 to shield the slot 29. In this case, when adjusting the torque value of the mechanical structure of the wrench, it is unnecessary to take off the handle 42. It is easy to adjust the scale plate 28 so that a user himself/herself can perform the torque correction process without sending the wrench back to the manufacturer or retailer.

Figure 13:
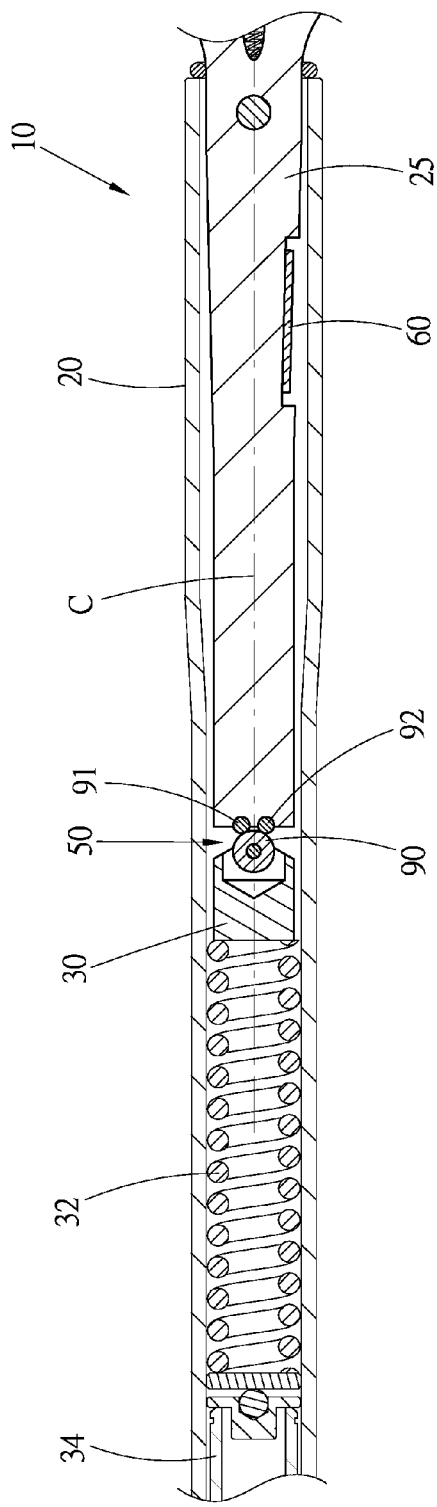
FIG. 13 is a sectional view of a part of a third embodiment of the wrench of the present invention.

FIG. 13 shows a third embodiment of the wrench of the present invention, in which the same components are denoted with the same reference numerals of the first embodiment. This embodiment provides another type of trip mechanism 50. The trip mechanism 50 includes a roller member 90 (ball or roller) and two circular rods 91, 92 respectively positioned at the front end of the abutment member 30 and the rear end of the flexible rod 25. The roller member 90 is in contact with the two circular rods 91, 92. Similarly, the trip mechanism 50 is positioned in the central line C of the flexible rod 25, whereby the torque value detected by the sensor 60 is the true torque value of the trip mechanism 50. That is, the two circular rods 91, 92 are symmetrically positioned on two sides of the central line C and the roller member 90 is positioned in the central line C.

Figure 14:
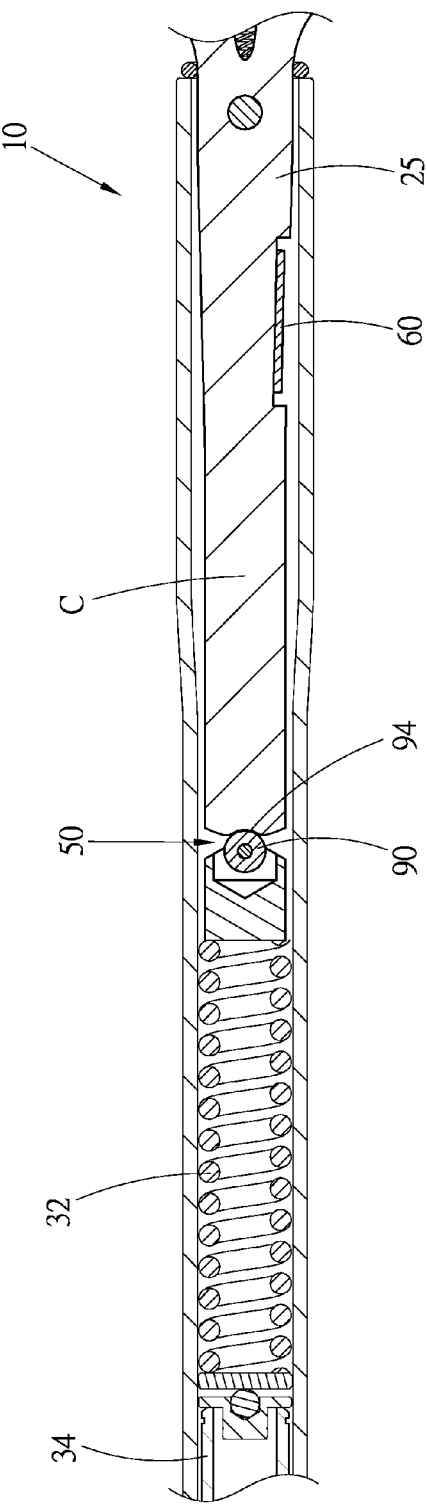
FIG. 14 is a sectional view of a part of a fourth embodiment of the wrench of the present invention.

FIG. 14 shows a fourth embodiment of the wrench of the present invention. This embodiment provides still another type of trip mechanism 50. The trip mechanism 50 includes a roller member 90 (ball or roller) and an arched recess 94 respectively disposed at the front end of the abutment member 30 and the rear end of the flexible rod 25. The roller member 90 is in contact with the arched recess 94. Similarly, the trip mechanism 50 is positioned in the central line C of the flexible rod 25. That is, the roller member 90 and the arched recess 94 are both positioned in the central line C.

Figure 15:
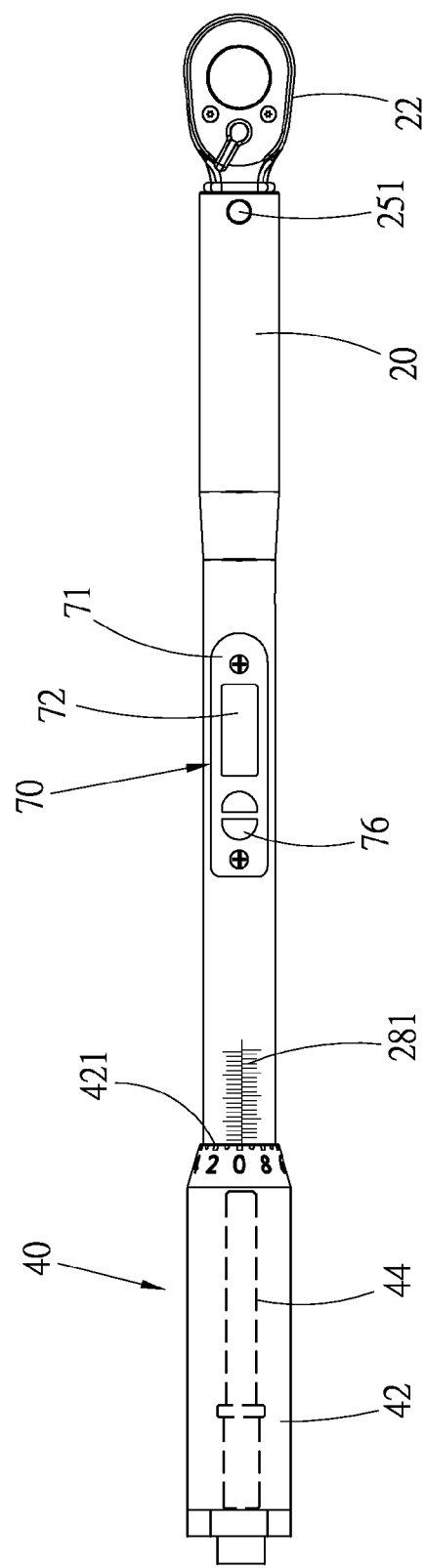
FIG. 15 is a top view of a fifth embodiment of the torque wrench of the present invention.

FIG. 15 is a top view of a fifth embodiment of the wrench of the present invention.

This embodiment is free from the scale plate. The tubular body is free from the window. The circumference of the tubular body 20 is marked with scales 281. The adjustment member 44 of the adjustment mechanism 40 is screwed in the tubular body 20. The front end of the adjustment member 44 abuts against a slide member or the elastic member. The handle 42 is connected with the adjustment member 44 in such a manner that the relative positions of the handle 42 and the adjustment member 44 in the axial direction of the tubular body 20 are adjustable. By means of rotating the handle 42, the torque value of the wrench 10 is adjustable. The adjustment member 44 and the handle 42 are together moved in the axial direction of the tubular body to change the elastic energy of the elastic member. The front end edge 421 of the handle 42 and the scales 281 form a scale indication. The value indicated by the front end edge 421 is exactly the set torque value of the wrench. In case of error of the torque value of the mechanism structure of the wrench 10, similarly, the aforesaid correction process is performed. A user disconnects the handle 42 from the adjustment member 44 and adjusts the handle 42 to a true position according to the torque value detected by the electronic structure, whereby the front end edge 421 is positioned at a correct scale. Finally, the handle 42 and the adjustment member 44 are reconnected to complete the torque correction process. In this embodiment, when performing the correction process, the relative positions of the handle 42 and the adjustment member 44 are changed to position the front end edge 421 of the handle 42 at the true scale.

The mechanical structure of the wrench is sensible and perceptible and which in the present invention is the structure for a user to operate the wrench. In case of wear of the trip mechanism of the wrench, the inaccuracy of the trip mechanism can be corrected by the electronic components of the wrench. The electronic components of the wrench can precisely detect the true torque value to eliminate the error of the mechanical structure and recover the true torque value of the mechanical structure. Moreover, the present invention is such designed that a user himself/herself can perform the torque correction process.

The above embodiments are only used to illustrate the present invention, not intended to limit the scope thereof. Many modifications of the above embodiments can be made without departing from the spirit of the present invention. For example, the trip mechanism and the adjustment structure of the wrench can have other forms.

What is claimed is:

1. A torque wrench capable of correcting torque, comprising:
   a tubular body;
   a head section positioned at a front end of the tubular body; a flexible rod pivotally disposed at the front end of the tubular body, the flexible rod being swingable, a rear end of the flexible rod being positioned in the tubular body, a front end of the flexible rod being fixedly connected with the head section;
   an abutment member and an elastic member disposed in the tubular body, the abutment member being positioned behind the flexible rod and movable within the tubular body; the elastic member elastically abutting against the abutment member;
   a trip mechanism disposed between the rear end of the flexible rod and the front end of the abutment member; the flexible rod and the abutment member being in contact with each other via the trip mechanism;
   an adjustment mechanism disposed at the rear end of the tubular body, the adjustment mechanism including a slide member disposed in the tubular body and movable within the tubular body; the adjustment mechanism being able to drive the slide member to move for adjusting the elastic force applied by the elastic member to the abutment member;
   a mechanical scale indication positioned on the tubular body for reading the set torque value of the wrench;
   at least one torque sensor disposed on one side of the flexible rod for detecting the strain of the flexible rod; and
   at least one display unit disposed on the tubular body for displaying the torque value detected by the torque sensor;
   wherein the tubular body is formed with a hollow section; a window is formed on the circumference of the tubular body;
   the mechanical scale indication including a scale plate, the scale plate being disposed on a circumference of the slide member and positioned between the window and the slide member; the scale plate being movable along with the slide member when it is mounted on the slide member; and
   a connection member being detachably fix the scale plate on the slide member, the connection member corresponding to the hollow section of the tubular body so that a user is able to unfasten the connection member for adjusting the position where the scale plate mounted on the slide member.

2. The torque wrench as claimed in claim 1, wherein the flexible rod has a central line; the trip mechanism being positioned in the central line of the flexible rod.

3. The torque wrench as claimed in claim 1, wherein the scale plate being formed with a longitudinal slot; the connection member being passed through the slot of the scale plate to detachably fix the scale plate on the slide member.

4. The torque wrench as claimed in claim 3, wherein the adjustment mechanism further includes a handle and an adjustment member, the adjustment member being disposed in the tubular body and rotatable within the tubular body without possibility of displacement, the front end of the adjustment member being screwed with the rear end of the slide member; the handle being fitted with the rear end of the tubular body and connected with the adjustment member, whereby by means of rotating the handle, the adjustment member is driven to rotate.

5. The torque wrench as claimed in claim 4, wherein an end collar is detachably connected with the front end of the handle to block the hollow section, when the end collar is detached from the handle, the hollow section being exposed to outer side.

6. The torque wrench as claimed in claim 4, wherein the handle is detachably connected with the adjustment member, the hollow section is blocked when the handle is connected with the adjustment member.

7. The torque wrench as claimed in claim 1, further comprising an electronic device mounted on the tubular body, the electronic device including a housing, a circuit unit, at least one pushbutton and the display unit; the housing being disposed on the tubular body; the circuit unit, the pushbutton and the display unit being disposed in the housing, the pushbutton and the display unit being electrically connected to the circuit unit.

8. The torque wrench as claimed in claim 1, wherein the trip mechanism includes a first recess, a second recess and an abutment block, the first and second recesses being respectively formed at the rear end of the flexible rod and the front end of the abutment member opposite to each other; the abutment block being disposed between the first and second recesses in contact therewith.

9. The torque wrench as claimed in claim 1, wherein the trip mechanism includes a roller member and two circular rods respectively positioned at the front end of the abutment member and the rear end of the flexible rod.

10. The torque wrench as claimed in claim 1, wherein the trip mechanism includes a roller member and a recess respectively disposed at the front end of the abutment member and the rear end of the flexible rod.

11. A torque correction method of the torque wrench capable of correcting torque as claimed in claim 1, wherein the wrench has a power supply, a mechanical structure composed of the flexible rod, the abutment member, the elastic member, the trip mechanism, the adjustment mechanism and the scale indication and an electronic structure composed of the torque sensor and the display unit, the torque correction method comprising steps of:

(1) starting up: the wrench being powered on to supply power for the torque sensor and the display unit;

(2) setting/adjusting the torque value of the mechanical structure of the wrench for tightening a threaded member: the adjustment mechanism being used to set/adjust the torque of the mechanical structure of the wrench to a necessary value, the torque value of the mechanical structure being a torque value applied to the wrench when the trip mechanism trips;

(3) the torque sensor detecting the trip torque value of the trip mechanism: the wrench being forced to wrench the threaded member until the trip mechanism trips, when the trip mechanism trips, the torque sensor detecting the torque value applied to the flexible rod;

(4) the display unit displaying the torque value when the trip mechanism trips: when the trip mechanism trips, the torque value applied to the flexible rod that is detected by the torque sensor being displayed on the display unit;

(5) comparing the set/adjusted torque value of the mechanical structure of the wrench with the torque value detected by the torque sensor to find whether the torque value detected by the torque sensor matches the set/adjusted torque value of the mechanical structure, if not, the procedure going back to step 2 to correct the torque value again; and (6) turning off: through step 5, if the torque value detected by the torque sensor matches the set/adjusted torque value of the mechanical structure, the wrench being powered off to end the correction process;

wherein in step (2), the position where the scale plate is mounted on the slide member being adjusted.

12. The torque correction method as claimed in claim 11, wherein the flexible rod has a central line; the trip mechanism being positioned in the central line of the flexible rod.

13. The torque correction method as claimed in claim 11, wherein the torque value of the mechanical structure is adjusted to the range from 0.96 time the torque value detected by the torque sensor to 1.04 times the torque value detected by the torque sensor.

* * * * *